United States Patent
Talley et al.

(10) Patent No.: US 8,363,564 B1
(45) Date of Patent: Jan. 29, 2013

(54) EVDO COVERAGE MODIFICATION BASED ON BACKHAUL CAPACITY

(75) Inventors: Ryan S. Talley, Overland Park, KS (US); Muralidhar Malreddy, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 230 days.

(21) Appl. No.: 12/731,895

(22) Filed: Mar. 25, 2010

(51) Int. Cl.
*H04J 1/16* (2006.01)
(52) U.S. Cl. .......................... 370/252; 455/13.4
(58) Field of Classification Search .................. 370/252, 370/315, 328, 338; 455/13.4, 522
See application file for complete search history.

(56) References Cited

U.S. PATENT DOCUMENTS

| | | | |
|---|---|---|---|
| 5,649,299 A | 7/1997 | Battin et al. | |
| 5,890,067 A | 3/1999 | Chang et al. | |
| 5,995,923 A | 11/1999 | Mermelstein et al. | |
| 6,014,568 A | 1/2000 | Alperovich et al. | |
| 6,021,328 A | 2/2000 | Curtis et al. | |
| 6,081,229 A | 6/2000 | Soliman et al. | |
| 6,148,207 A | 11/2000 | Baum | |
| 6,161,022 A | 12/2000 | Hwang et al. | |
| 6,172,974 B1 | 1/2001 | Tseng et al. | |
| 6,208,631 B1 | 3/2001 | Kim | |
| 6,223,041 B1 | 4/2001 | Egner et al. | |
| 6,243,590 B1 | 6/2001 | Reddy et al. | |
| 6,272,358 B1 | 8/2001 | Brent et al. | |
| 6,418,147 B1 | 7/2002 | Wiedeman | |
| 6,480,541 B1 | 11/2002 | Girod et al. | |
| 6,501,736 B1 | 12/2002 | Smolik et al. | |
| 6,522,888 B1 | 2/2003 | Garceran et al. | |
| 6,526,029 B1 | 2/2003 | Zhong | |
| 6,577,616 B1 | 6/2003 | Chaudry et al. | |
| 6,591,110 B1 | 7/2003 | Kim et al. | |
| 6,606,496 B1 | 8/2003 | Salvarani et al. | |
| RE38,244 E | 9/2003 | Han et al. | |
| 6,625,119 B1 | 9/2003 | Schuster et al. | |
| 6,718,183 B1 | 4/2004 | Blust et al. | |
| 6,745,012 B1 | 6/2004 | Ton et al. | |
| 6,757,520 B2 | 6/2004 | Attar | |
| 6,775,252 B1 | 8/2004 | Bayley | |
| 6,839,356 B2 | 1/2005 | Barany et al. | |
| 6,856,954 B1 | 2/2005 | Su | |

(Continued)

FOREIGN PATENT DOCUMENTS

| WO | 2004/004249 | 1/2004 |
|---|---|---|
| WO | 2004/028095 | 4/2004 |

OTHER PUBLICATIONS

Unpublished U.S. Appl. No. 12/478,318 entitled "Method and System for Controlling Data Rates Based on Backhaul Capacity" filed Jun. 4, 2009 in the name of Shilpa K. Srinivas et al.

(Continued)

*Primary Examiner* — Ricky Ngo
*Assistant Examiner* — Kan Yuen

(57) ABSTRACT

A method and system is disclosed for adjusting wireless access coverage based on backhaul capacity. A base station, such as a femtocell, will determine the capacity of its backhaul connection in the downlink direction. The base station will then adjust the power level of it forward link to help ensure that the forward-link data rate to an access terminal is approximately matched to the determined capacity of its backhaul connection. In an example embodiment, the base station will adjust the power level of its pilot until the access terminal is requesting a forward-link data rate commensurate with the downlink rate on the backhaul connection.

19 Claims, 5 Drawing Sheets

U.S. PATENT DOCUMENTS

| | | |
|---|---|---|
| 6,944,454 B1 | 9/2005 | Lee et al. |
| 6,970,437 B2 | 11/2005 | Lott et al. |
| 6,970,871 B1 | 11/2005 | Rayburn |
| 6,975,609 B1 | 12/2005 | Khaleghi et al. |
| 6,980,523 B1 | 12/2005 | Lipford et al. |
| 7,058,124 B2 | 6/2006 | Koo |
| 7,099,283 B2 | 8/2006 | Matta et al. |
| 7,120,447 B1 | 10/2006 | Chheda et al. |
| 7,130,287 B2 | 10/2006 | Nounin et al. |
| 7,130,311 B2 | 10/2006 | Yavuz et al. |
| 7,139,274 B2 | 11/2006 | Attar |
| 7,142,562 B2 | 11/2006 | Yavuz et al. |
| 7,190,958 B1 | 3/2007 | Yarkosky |
| 7,209,758 B1 | 4/2007 | Moll et al. |
| 7,236,796 B2 | 6/2007 | Soliman |
| 7,245,915 B2 | 7/2007 | Matta et al. |
| 7,328,027 B1 | 2/2008 | Mangal |
| 7,394,789 B2 | 7/2008 | Sakawa et al. |
| 7,406,319 B2 | 7/2008 | Kostic et al. |
| 7,411,923 B2 | 8/2008 | Attar et al. |
| 7,411,974 B2 | 8/2008 | Attar et al. |
| 7,426,180 B2 | 9/2008 | Xu |
| 7,426,395 B2 | 9/2008 | Stephens |
| 7,433,682 B1 | 10/2008 | Moll et al. |
| 7,440,431 B2 | 10/2008 | Sindhushayana et al. |
| 7,474,627 B2 | 1/2009 | Chheda et al. |
| 7,486,645 B2 | 2/2009 | Li et al. |
| 7,496,058 B2 | 2/2009 | Kim et al. |
| 7,602,722 B2 | 10/2009 | Chheda |
| 7,729,243 B2 | 6/2010 | Ananthaiyer |
| 7,742,768 B2 | 6/2010 | Liu et al. |
| 7,746,816 B2 | 6/2010 | Attar et al. |
| 7,751,839 B2 | 7/2010 | Bowers et al. |
| 7,764,651 B2 | 7/2010 | Kwon |
| 7,822,064 B2 | 10/2010 | Thubert |
| 7,852,759 B2 | 12/2010 | Stephenson |
| 7,894,488 B2 | 2/2011 | Shim |
| 7,921,348 B2 | 4/2011 | Seidel et al. |
| 7,953,048 B2 | 5/2011 | Yoon et al. |
| 8,014,280 B2 | 9/2011 | Zhang et al. |
| 8,040,803 B1 | 10/2011 | Pawar et al. |
| 8,094,623 B2 | 1/2012 | Attar et al. |
| 8,107,438 B1 | 1/2012 | Singh et al. |
| 2002/0061749 A1 | 5/2002 | Hunzinger |
| 2002/0151310 A1 | 10/2002 | Chung et al. |
| 2002/0191693 A1 | 12/2002 | Nakagaki |
| 2003/0017831 A1 | 1/2003 | Lee et al. |
| 2003/0064741 A1 | 4/2003 | Silva et al. |
| 2003/0072278 A1 | 4/2003 | Wu et al. |
| 2003/0095551 A1 | 5/2003 | Gotoh |
| 2003/0114172 A1 | 6/2003 | Soliman |
| 2003/0117956 A1 | 6/2003 | Lee |
| 2003/0129982 A1 | 7/2003 | Perini |
| 2003/0163558 A1 | 8/2003 | Cao et al. |
| 2003/0195006 A1 | 10/2003 | Choong et al. |
| 2004/0017860 A1 | 1/2004 | Liu et al. |
| 2004/0057420 A1 | 3/2004 | Curcio et al. |
| 2004/0071086 A1 | 4/2004 | Haumont et al. |
| 2004/0179525 A1 | 9/2004 | Balasubramanian et al. |
| 2004/0196852 A1 | 10/2004 | Aksu et al. |
| 2004/0213182 A1 | 10/2004 | Huh et al. |
| 2004/0218533 A1 | 11/2004 | Kim et al. |
| 2004/0259565 A1 | 12/2004 | Lucidarme |
| 2005/0032522 A1 | 2/2005 | Soong et al. |
| 2005/0052996 A1 | 3/2005 | Houck et al. |
| 2005/0111397 A1 | 5/2005 | Attar et al. |
| 2005/0130663 A1 | 6/2005 | Hong et al. |
| 2005/0153695 A1 | 7/2005 | Cho |
| 2005/0159165 A1 | 7/2005 | Argyropoulos et al. |
| 2005/0201289 A1 | 9/2005 | Smolinske et al. |
| 2005/0250509 A1 | 11/2005 | Choksi |
| 2005/0286440 A1 | 12/2005 | Strutt et al. |
| 2006/0077994 A1 | 4/2006 | Spindola et al. |
| 2006/0121855 A1 | 6/2006 | Dillon |
| 2006/0126509 A1 | 6/2006 | Abi-Nassif et al. |
| 2006/0159051 A1 | 7/2006 | English |
| 2006/0182062 A1 | 8/2006 | Sdralia et al. |
| 2006/0223585 A1 | 10/2006 | Legg |
| 2006/0229087 A1 | 10/2006 | Davis, III et al. |
| 2006/0250953 A1 | 11/2006 | Mooney et al. |
| 2006/0252429 A1 | 11/2006 | Chen et al. |
| 2006/0268764 A1 | 11/2006 | Harris |
| 2006/0291383 A1 | 12/2006 | Bi et al. |
| 2007/0060165 A1 | 3/2007 | Black et al. |
| 2007/0099648 A1 | 5/2007 | Kim et al. |
| 2007/0109967 A1 | 5/2007 | Ha |
| 2007/0127407 A1 | 6/2007 | Attar et al. |
| 2007/0127522 A1 | 6/2007 | Lundh et al. |
| 2007/0177510 A1 | 8/2007 | Natarajan et al. |
| 2007/0178906 A1 | 8/2007 | Gao et al. |
| 2007/0183427 A1 | 8/2007 | Nylander et al. |
| 2007/0197223 A1 | 8/2007 | Jung et al. |
| 2007/0201438 A1 | 8/2007 | Yoon et al. |
| 2007/0201439 A1 | 8/2007 | Sun et al. |
| 2007/0274257 A1 | 11/2007 | Bae et al. |
| 2008/0008093 A1 | 1/2008 | Wang |
| 2008/0049699 A1 | 2/2008 | Li et al. |
| 2008/0049706 A1 | 2/2008 | Khandekar et al. |
| 2008/0130495 A1 | 6/2008 | Dos Remedios et al. |
| 2008/0186862 A1 | 8/2008 | Corbett et al. |
| 2008/0188228 A1 | 8/2008 | Pecen et al. |
| 2008/0207170 A1 | 8/2008 | Khetawat et al. |
| 2008/0233967 A1 | 9/2008 | Montojo et al. |
| 2008/0247450 A1 | 10/2008 | Alexander |
| 2008/0280615 A1 | 11/2008 | Vinayakray-Jani |
| 2009/0059790 A1 | 3/2009 | Calvert et al. |
| 2009/0088157 A1 | 4/2009 | Aaron |
| 2009/0141683 A1 | 6/2009 | Grinshpun et al. |
| 2009/0170547 A1 | 7/2009 | Raghothaman et al. |
| 2009/0187690 A1 | 7/2009 | Smart et al. |
| 2009/0257361 A1 | 10/2009 | Deshpande et al. |
| 2009/0262720 A1 | 10/2009 | Kwon et al. |
| 2009/0285159 A1 | 11/2009 | Rezaiifar |
| 2009/0288145 A1 | 11/2009 | Huber et al. |
| 2010/0014487 A1 | 1/2010 | Attar et al. |
| 2010/0189096 A1 | 7/2010 | Flynn et al. |
| 2010/0240373 A1* | 9/2010 | Ji et al. ........................ 455/436 |
| 2010/0271962 A1* | 10/2010 | Han et al. ..................... 370/252 |
| 2010/0296407 A1 | 11/2010 | Medvedev et al. |
| 2010/0309861 A1 | 12/2010 | Gorokhov et al. |
| 2011/0053596 A1 | 3/2011 | Wohlert et al. |
| 2011/0085607 A1 | 4/2011 | Dhandu et al. |
| 2011/0116419 A1 | 5/2011 | Cholas et al. |
| 2011/0292785 A1 | 12/2011 | Hardin |
| 2012/0044908 A1* | 2/2012 | Spinelli et al. ............... 370/331 |

OTHER PUBLICATIONS

Unpublished U.S. Appl. No. 12/538,624 entitled "T1 Throttle Based Reva Data Rate Control" filed Aug. 10, 2009 in the name of Sachin Vargantwar et al.

U.S. Appl. No. 12/141,569, Notice of Allowance dated Sep. 28, 2011.

U.S. Appl. No. 12/388,199, Final Office Action dated Oct. 11, 2011.

U.S. Appl. No. 12/478,318, Non-Final Office Action dated Oct. 27, 2011.

Emilio Mino et al., Information Society Technologies, "Integration of cooperation on Winner II System Concept," IST-4-027756 Winner II D4.8.3, Nov. 29, 2007.

U.S. Appl. No. 12/432,736, filed Apr. 29, 2009, "Using DRCLocks for Conducting Call Admission Control".

U.S. Appl. No. 12/397,855, filed Mar. 4, 2009, "Using Packet-Transport Metrics for Setting DRCLocks".

Xin Liu et al., "Experiences in a 3G Network: Interplay between the Wireless Channel and Applications, "MobiCom '08, Sep. 14-19, 2008.

Woon-Young Yeo et al., "Traffic management of high-speed CDMA systems based on load prediction,"IEICE Electronics Express, vol. 6, No. 7, pp. 389-394, published Apr. 10, 2009.

U.S. Appl. No. 11/746,229, filed May 9, 2007, "Using VoIP-Quality Metrics to Dynamically Adjust the EV-DO Reverse Activity Bit".

U.S. Appl. No. 12/350,694, filed Jan. 8, 2009, "Using Packet-Transport Metrics for Call-Admission Control".

3rd Generation Partnership Project 2, "cdma2000 High Rate Packet Data Air Interface," 3GPP2 C.S0024-0, v. 4.0 (Oct. 2002).

3rd Generation Partnership Project 2, "cdma2000 High Rate Packet Data Air Interface," 3GPP2 C.S0024-A, v. 3.0 (Sep. 2006).
U.S. Appl. No. 12/538,624, Final Office Action dated Dec. 19, 2011.
U.S. Appl. No. 12/478,318, Notice of Allowance dated Jan. 30, 2012.
U.S. Appl. No. 12/141,569, filed Jun. 18, 2008.
U.S. Appl. No. 12/388,199, filed Feb. 18, 2009.
U.S. Appl. No. 12/507,913, filed Jul. 23, 2009.
U.S. Appl. No. 12/494,999, filed Jun. 30, 2009.
U.S. Appl. No. 12/756,629, filed Apr. 8, 2010.
U.S. Appl. No. 11/746,229, Pre-Interview Communication dated Dec. 30, 2009.
U.S. Appl. No. 11/746,229, First Action Interview Summary dated Jun. 2, 2010.
U.S. Appl. No. 11/746,229, Notice of Allowance dated Aug. 3, 2010.
U.S. Appl. No. 11/746,229, Interview Summary dated Apr. 6, 2010.
U.S. Appl. No. 12/141,569, Non-Final Office Action dated Mar. 22, 2011.
U.S. Appl. No. 12/350,693, Non-Final Office Action dated Jun. 22, 2010.
U.S. Appl. No. 12/350,694, Final Office Action dated Dec. 9, 2010.
U.S. Appl. No. 12/350,694, Non-Final Office Action dated Feb. 18, 2011.
U.S. Appl. No. 12/350,694, Notice of Allowance mailed Jun. 10, 2011.
U.S. Appl. No. 12/397,855, Non Final Office Action dated Oct. 12, 2010.
U.S. Appl. No. 12/397,855, Final Office Action dated Apr. 1, 2011.
U.S. Appl. No. 12/388,199, Non-Final Office Action dated Mar. 30, 2011.
U.S. Appl. No. 12/478,318, Non Final Office Action dated Dec. 8, 2010.
Ferrus, R. et al., "Evaluation of a Cell Selection Framework for Radio Access Networks considering Blackhaul Resource Limitations," The 18th Annual IEEE International Symposium on Personal, Indoor and Mobile Radio Communications (PIMRC'07).
Conklin, G. et al., "Video Coding for Streaming Media Delivery on the Internet," IEE Transactions on Circuits and Systems for Video Technology, 11(3):269-281 (Mar. 2001).
International Search Report and Written Opinion from International Application No. PCT/US2007/009296, dated Oct. 17, 2007.
U.S. Appl. No. 12/397,855, Non-Final Office Action dated Dec. 5, 2011.
U.S. Appl. No. 12/432,736, Non Final Office Action dated Mar. 27, 2012.
U.S. Appl. No. 12/756,629, Non Final Office Action dated Mar. 29, 2012.
U.S. Appl. No. 12/494,999, Notice of Allowance dated Mar. 30, 2012.
Rosenberg, J. et al., "SIP: Session Initiation Protocol," Network Working Group, Request for Comments: 3261, Jun. 2002, pp. 1-265.
3rd Generation Partnership Project, "cdma2000 Femtocell Network: 1x and IMS Network Aspects," 3GPP2 X. S0059-2000-0, Version 1.0, Jan. 2010.
Kjellberg, Richard, "Analysis of an AIS Implementation in Tokyo Bay," web.archive.org/web/20090427053120/http://www.gpc.se/tokyo/tokyo.htm (Apr. 27, 2009).
Xing, Jianping et al., "Research and Integration of Marine Embedded AIS Information Terminal," Proceedings of the 7th World Congress on Intelligent Control and Automation, Jun. 25-27, 2008, Chongqing, China, pp. 3586-3589.
Openwave, "Overview of Location Technologies," Nov. 19, 2002, 12 pages.

* cited by examiner

| BACKHAUL DOWNLINK RATE (kbps) | FORWARD-LINK DATA RATE (kbps) | DRC CODE |
|---|---|---|
| < 128 | Null | 0 |
| < 128 | 38.4 | 1 |
| < 128 | 76.8 | 2 |
| 128 – 256 | 153.6 | 3 |
| 256 – 512 | 307.2 | 4 |
| 256 – 512 | 307.2 | 5 |
| 512 – 768 | 614.4 | 6 |
| 512 – 768 | 614.4 | 7 |
| 768 – 1,024 | 921.6 | 8 |
| 1,024 – 1,500 | 1,228.8 | 9 |
| 1,024 – 1,500 | 1,228.8 | 10 |
| 2,000 – 3,000 | 1,843.2 | 11 |
| > 3,000 | 2,457.6 | 12 |
| 1,500 – 3,000 | 1,536 | 13 |
| > 3,000 | 3,072 | 14 |

FIG. 3

EVDO COVERAGE MODIFICATION BASED ON BACKHAUL CAPACITY

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

A subscriber (or user) in a service provider's wireless communication system accesses the system for communication services via an access terminal, such as a cellular telephone, pager, or appropriately equipped portable computer, for instance. When an access terminal is positioned in a cell, the access terminal (also referred to herein by "AT") communicates via an RF air interface with the BTS antenna of the cell. Consequently, a communication path or "channel" is established between the AT and the transport network, via the air interface, the BTS, the BSC and the switch or gateway.

Functioning collectively to provide wireless (i.e., RF) access to services and transport in the wireless communication system, the BTS, BSC, MSC, and PDSN, comprise (possibly with additional components) what is typically referred as a Radio Access Network (RAN). In practice, the RAN may be organized in a hierarchical manner, with multiple BTSs under the control of a single BSC, multiple BSCs linked to a single MSC, and multiple MSCs in one region or metropolitan area connecting to RANs in other regions or metropolitan areas by way of gateway MSCs or other inter-regional switches.

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

The functional combination of a BTS of a cell or sector with a BSC is commonly referred to as a "base station," although the actual physical configuration can range from an integrated BTS-BSC unit to a distributed deployment of multiple BTSs under a single BSC, as described above. Regardless of whether it is configured to support one cell, multiple cells, or multiple sectors, a base station is typically deployed to provide coverage over a geographical area on a scale of a few to several square miles and for tens to hundreds to several thousands (or more) of subscribers at any one time. On this scale, coverage is referred to as "macro-network coverage" and the base station is referred to as a "macro-type base station."

More recently, a type of base-station functional unit aimed at coverage over a much smaller physical area and at concurrent support of many fewer subscribers has been introduced. Referred to generically herein as a "micro-type base station," this device, roughly comparable in size to desktop phone, can operate to fill in gaps in macro-network coverage (e.g., in buildings), as well as provide limited and exclusive coverage to individual subscribers within residential (or other small-scale) spaces. As such, macro-network service providers have begun offering micro-type base stations as consumer devices, under the more technical moniker of "femtocell." In addition to "femtocell," other terms for a micro-type base station used interchangeably herein include "femto base station," "femto BTS," "picocell," "pico BTS," "microcell," "micro BTS," and "Low-Cost Internet Base Station" ("LCIB"). The prefixes "femto," "pico," and "micro" are also used herein to refer correspondingly to respective coverage areas. Note that "low-cost" is not intended to be limiting; that is, devices of any cost may be categorized as LCIBs, although it may be expected that most LCIBs will typically be less expensive on average than most macro-network base stations.

A typical femtocell may be considered to be essentially a low-power, low-capacity version of a macro-type base station, providing the same RF interface for wireless access, only for a much smaller physical coverage area. However, instead of connecting directly to an MSC, PDSN, other network switch, a femtocell communicates with the service provider's network via one or another form of broadband connection associated with or available to the consumer-owner (or renter) of the femtocell. With respect to a subscriber's wireless access, the small coverage area of a femtocell is viewed by the wireless communication system in the same manner as any other macro coverage area (e.g., cell or sector). In particular, a subscriber may move between neighboring coverage areas of macro-type base stations and femtocells, and even between neighboring coverage areas of different femtocells, in the same way the subscriber moves between neighboring macro coverage areas.

More specifically, as a subscriber at an access terminal moves between wireless coverage areas of a wireless communication system, such as between cells, sectors, or femto coverage areas, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector. By convention, an AT is said to handoff from a "source" cell or sector (or base station) to a "target" cell or sector (or base station).

In some wireless communication systems or markets, a wireless service provider may implement more than one type of air interface protocol within a single system. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0, A, or other version thereof (hereafter "IS-856"). In such a "hybrid system," an access terminal might not only hand off between coverage areas under a common air interface protocol (e.g., between IS-2000 sectors) but may also hand off between the different air interface protocols, such as between IS-2000 and IS-856. An access terminal capable of communicating on multiple air interface protocols of a hybrid system is referred to as a "hybrid access terminal." Handoff between different air interface protocols (or, more generally, between different access technologies) is known as "vertical" handoff.

OVERVIEW

An AT receives data from a base station (or sector or a BTS) on a "forward link" and sends data to the base station on a "reverse link." The data rate achievable on either RF link depends, at least in part, on the RF conditions between the transmitting and receiving entities on that link, as can be measured as some form of signal-to-noise ratio ("SNR"). Generally, the higher the SNR, the higher the achievable data rate, and vice versa. The signal power level (the numerator in the SNR) measured by a receiving entity depends on the transmission power level of the transmitting entity and on the distance between the transmitting and receiving entities, among other possible factors. The amount of power that a transmitting entity applies during transmission is typically governed by a power budget for that entity, as well as considerations of the contribution to noise and interference as the transmission power level is adjusted.

In a deployment of a wireless communication system, the landline connection between a base station and other RAN components situated further toward the network core is commonly referred to as a "backhaul." For many typical configurations involving macro-type base stations, the backhaul may comprise one or more high-capacity telecommunication trunks that support transport of data at rates generally exceeding the maximum rates achievable on the RF link between the base station and one or another access terminal served by the base station. As a result, the RF link represents a limiting factor in the maximum data rates between an AT and core RAN elements, whereas the backhaul can accommodate any data rate that is achievable on the RF link. Accordingly, the procedures used to control and manage transmission power and data rates on the RF link generally don't take account of data-rate limitations on the backhaul, since the backhaul usually doesn't represent a predominant limiting factor.

It may not always be the case, however, that the backhaul supports data rates exceeding those achievable on the RF link. For example, a femtocell may connect to a service provider's network by way of a residential broadband connection (e.g., cable TV line or Digital Subscriber Line (DSL)) or the like. As such, this broadband connection plays the role of backhaul between the femtocell and other RAN elements of the service provider's network. In contrast to a typical backhaul used for a macro-type base station, a broadband-based backhaul may not support the maximum data rates achievable on a femtocell's RF link to one or another access terminal. In this circumstance, the backhaul, and not the RF link, may represent the predominant limitation to achievable data rates. It would therefore be desirable to devise procedures for control and management of transmission power and data rates on the RF link that do account for data-rate limitations on the backhaul.

Hence, in one respect, various embodiments of the present invention provide, in a base station communicatively coupled with a wireless communication system by way of a backhaul connection, a method comprising: determining a capacity of the backhaul connection for transport of data communications; and adjusting a transmission power level on a forward link of an air interface to a first access terminal based on the determined capacity.

In another respect, various embodiments of the present invention provide, a base station configured to be communicatively coupled with a wireless communication system by way of a backhaul connection, the base station comprising: means for determining a capacity of the backhaul connection for transport of data communications; and means for adjusting a transmission power level on a forward link of an air interface to a first access terminal based on the determined capacity.

In still another respect, various embodiments of the present invention provide a tangible computer-readable medium having instructions stored thereon that, upon execution by a base station, cause the base station to carry out functions comprising: determining a capacity of a backhaul connection by which the base station is configured to be communicatively connected with a wireless communication system; and adjusting a transmission power level on a forward link of an air interface to a first access terminal based on the determined capacity.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

BRIEF DESCRIPTION OF THE DRAWINGS

FIG. 3 is an example table for mapping backhaul downlink data rate to forward-link data rate that could be used by a base station to implement an example method of adjusting wireless access coverage based on backhaul capacity.

DETAILED DESCRIPTION

The present invention will be described by way of example with reference to Code Division Multiple Access ("CDMA") communications in general, and to IS-2000 and IS-856 communications in particular. As described below, IS-2000 applies to both circuit-cellular and packet-data communications, and is referred to herein as "conventional" CDMA communications. IS-856 applies more exclusively to packet-data communications (including, e.g., real-time voice and data applications), and is referred to herein as "high rate" packet-data communications. Under IS-2000, packet-data communications are conventionally referred to as "1×-RTT" communications, also abbreviated as just "1×." Packet-data communications under IS-856 are conventionally referred to as "EVDO" communications, also abbreviated as just "DO." It should be understood that the present invention can apply to other wireless voice and data protocols including, without limitation, IS-95 and GSM, which, together with IS-2000 and IS-856 are considered herein, individually or in any combination, to comprise a CDMA family of protocols.

Figure 1:
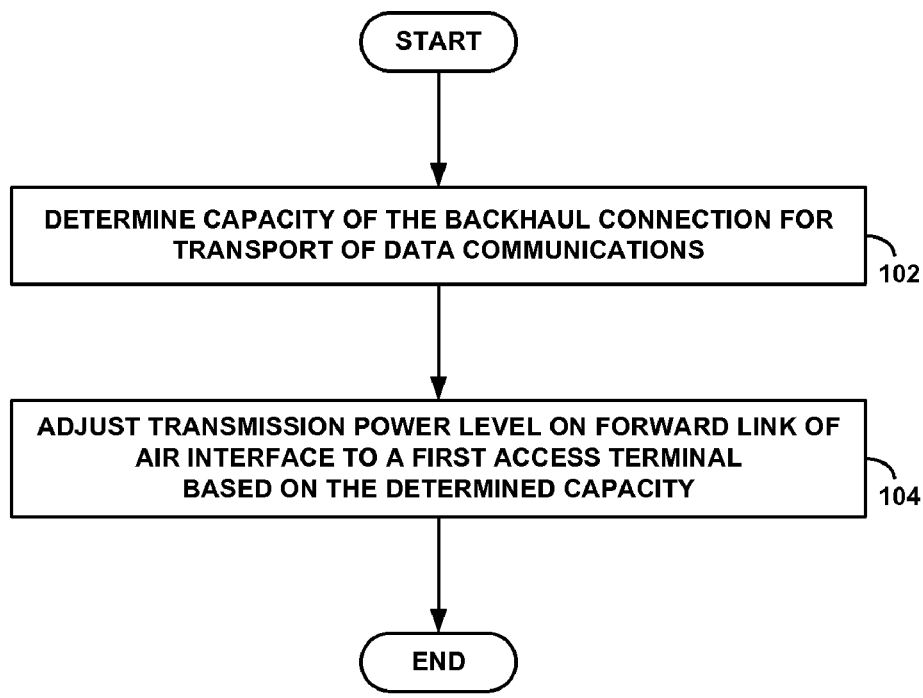
FIG. 1 is a flowchart depicting an example embodiment of a method of adjusting wireless access coverage based on backhaul capacity.

FIG. 1 is a flowchart depicting an example embodiment of a method of adjusting wireless access coverage based on backhaul capacity. By way of example, the steps of the flowchart could be implemented in a base station communicatively coupled with a wireless communication system by way of a backhaul connection. The base station could be a macro-type base station or a micro-type base station that operates according to a CDMA family of protocols, including IS-856. As described above, a macro-type base station may then be taken to comprise a cell and/or sector BTS under the control of a BSC and configured to operate according to a CDMA family of protocols, including at least 1×-RTT and EVDO, while a micro-type base station may be considered a femtocell.

At step 102, the base station determines a capacity of the backhaul connection for transport of data communications. In accordance with the example embodiment, the backhaul connection could comprise packet-switch data transport. For example, the base station could be a femtocell connected by way of a residential broadband connection to an ISP that provides connectivity to the Internet or other public data network. One or another packet-switched data path from the ISP may then provide connectivity to the wireless communication system. In this configuration, the residential broadband connection could be a cable modem or DSL modem connection to the ISP, and could support a PPP connection or other packet-data transport. As such, the backhaul connection could comprise the broadband connection between the femtocell and the ISP. It will be appreciated that the backhaul connection could comprise additional or alternative communication links.

In further accordance with the example embodiment, determining the capacity of the backhaul connection could comprise performing a data-rate test with a test server via the backhaul connection, and then, based on the data-rate test, determining a supportable data rate to the base station over the backhaul connection. As an example, the test server could be communicatively coupled with the ISP via one or another packet-switched data path in the Internet, and the femtocell could establish a communicative connection with the test server via the backhaul connection to the ISP. The femtocell could then invoke a data transfer test between itself and the test server, whereby a data transfer rate is measured in one or more data transfers between the femtocell and the test server. To the extent that the data rate between the test server and the ISP is either known, can be measured, or can be assumed to be sufficiently great so as to contribute negligibly to any data transport delay between the test server and the femtocell, data rates supported by the backhaul connection may be determined. In particular, a maximum data rate for transport over the backhaul to the femtocell can be determined in this manner.

At step 104, the base station adjusts a transmission power level on a forward link of an air interface to a first access terminal based on the determined capacity of the backhaul connection. In accordance with the example embodiment, the base station could determine the backhaul capacity in terms of a measured data rate to the base station, or use the determined capacity to determine a data rate to the base station via the backhaul, as described above. Again taking the base station to be a femtocell and the backhaul to be a broadband connection to the ISP, femtocell could then set its transmission power on the forward link to a tuned level that supports a forward-link data rate to the first access terminal commensurate with the supportable data rate on the backhaul.

The tuned level could correspond to a transmission power level such that the first AT will not receive data on the forward link at a rate that is greater than the measured data rate on the backhaul connection. For example, during an active EVDO data communication session, an access terminal will periodically request from the base station a forward-link data rate based on measurement of the power level of a signal received from the base station. More specifically, an AT with an active EVDO session periodically sends a "data rate control" ("DRC") request message to the base state, wherein the message contains a coded value that corresponds to a (requested) forward-link data rate (and possibly an encoding scheme). The AT determines what rate to request based on a measured SNR on the forward link, usually by matching the measured SNR to a corresponding data rate in a look-up table stored in the AT's memory.

In conventional operation, the base station will generally accommodate the request by transmitting data at the requested rate, without regard to whether or not the backhaul connection can support the requested rate. However, in accordance with the example embodiment, the base station will instead compare the data rate requested in the DRC request message with a rate determined to be supportable by the backhaul connection, and responsively adjust its forward-link transmission power level as necessary until the AT requests (via DRC messages) a forward-link data rate that is commensurate with the determined rate supportable on backhaul connection.

In practice, the base station transmits a pilot beacon signal for use by ATs as a timing reference and to identify the base station. The SNR measure used by the AT to select a DRC rate comprises a ratio of the strength of the received pilot signal to received noise (or more accurately, noise plus interference, as described below). The received strength of the pilot signal (and thus the SNR) at the AT depends, in part, on the distance between the AT and the base station, and on the transmission power level set by the base station. In further accordance with the example embodiment, the base station will adjust the strength of its pilot signal based on the comparison of the first access terminal's DRC request messages with the data rate supportable on the backhaul connection.

More particularly, considering again a configuration that uses a femtocell, if the AT is requesting a data rate that exceeds that supportable on the backhaul connection, the femtocell will reduce the transmitted power level of its pilot signal until it receives DRC request messages from the AT corresponding to data rates that don't generally exceed the backhaul rate. Conversely, if the AT is requesting a data rate that is below that supportable from the ISP to the femtocell on the backhaul connection, and the femtocell's pilot signal power level is not above a maximum threshold, the femtocell will increase the transmitted power level of its pilot signal until it receives DRC request messages corresponding to data rates close to the backhaul rate.

Owing to the sometimes bursty nature of packet-data communications, strict adherence to keeping the requested rate from exceeding the backhaul rate may not be absolutely necessary, so long as the forward-link data rate is maintained reasonably close to the backhaul rate. This is what is meant by keeping the rates "commensurate" with one another. A practical test for commensurate rates might, for example, require the requested rate in a DRC message to fall within a predefined range about the backhaul rate. In this case, the requested rate could fluctuate above and below the backhaul rate so long as it remains within the range. Other criteria for specifying commensurate rates are possible as well. Tuning the forward-link data rate to the data rate supported on the backhaul connection to the base station in this manner advantageously helps to maintain optimal throughput and transmission power levels on the forward link.

The adjustment of a base station pilot signal strength based on comparison of DRC requests with backhaul capacity may further be understood to have the effect of adjusting the physical coverage area of the base station based on the backhaul capacity. This is because the size of the physical coverage area of a base station is determined, at least in part, by the strength of its pilot signal. Hence, as the base station, in accordance with the example embodiment, adjusts its pilot strength to cause DRC requests to be commensurate with the backhaul capacity it necessarily also adjusts the size its coverage area.

While not explicitly included as step in flowchart of FIG. 1, the example method may further comprise adjusting a transmission power level on a forward link of the air interface to a second access terminal based on the determined capacity of the backhaul connection. In this way, a base station can ensure that each of the first and second (and possibly more) access terminals receive forward-link data transmissions at rates commensurate with the rate supportable on the backhaul connection.

In the discussion of FIG. 1, as well as in other discussions and explanations herein, the terms "first" and "second" as applied to "access terminals" and the like, are used as identifying labels, and not meant to imply any numerical ordering (although a numerical ordering is not necessarily excluded). It will also be appreciated that the steps of FIG. 1 are shown by way of example, and that additional and/or alternative steps or alternative ordering of steps could be carried out and still remain within the scope and spirit of the present invention.

Figure 2:
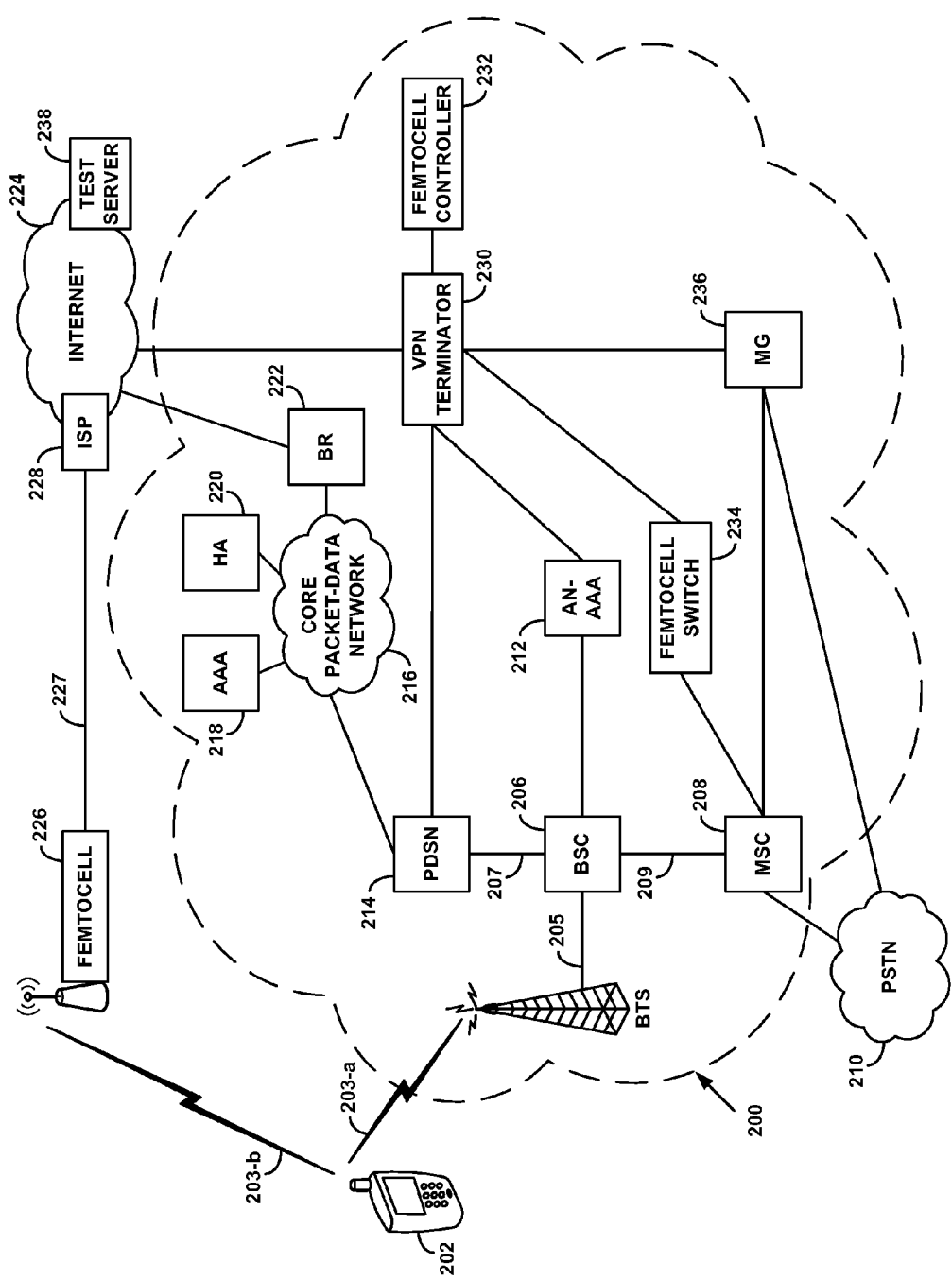
FIG. 2 is a simplified block diagram of a wireless communication system in which an example embodiment of a method of adjusting wireless access coverage based on backhaul capacity could be carried out.

FIG. 2 shows a simplified block diagram of a wireless communication network 200 that can be operated by a wireless service provider, and in which an exemplary embodiment of a method and system for adjusting wireless access coverage based on backhaul capacity can be employed. Subscribers engage in communications in the wireless communication system via access terminals, whereby access terminals provide a physical basis for interfacing with the communication system, and subscribers are associated with respective access terminals according to subscriber account information that is maintained by the system in one or more data bases. Accordingly, a subscriber is represented by an associated access terminal AT 202 in FIG. 2.

As shown, AT 202 communicates over an air interface 203-a with a BTS 204, which is then coupled with a BSC 206 via a communicative link 205. In an alternate configuration, the BTS could be integrated with the BSC. AT 202 is also shown as having an air interface 203-b to femtocell 226. Communicative connections between the femtocell 226 and network 200 are described in more detail below. Transmissions over air interface 203-a from BTS 204 to AT 202 represent a "forward link" from the BTS to the access terminal, while transmissions over interface 203-a from AT 202 to BTS 204 represent a "reverse link" from the AT. Similarly, transmissions over air interface 203-b from femtocell 226 to AT 202 represent a forward link from the femtocell to the access terminal, while transmissions over interface 203-b from AT 202 to femtocell 226 represent a reverse link from the AT. Air interfaces 203-a and 203-b represent links that could be active concurrently or possibly at different times, depending on the operational state of the AT, its physical location with respect to the BTS and the femtocell, and the type data session it seeks or is engaged in.

BSC 206 is connected via a communicative link 209 to MSC 208, which acts to control assignment of air traffic channels (e.g., over air interface 203-a,b), and provides access to wireless circuit-switched services such as circuit-voice and circuit-data (e.g., modem-based packet data) service. As represented by its connection to PSTN 210, MSC 208 is also coupled with one or more other MSCs, other telephony circuit switches in the operator's (or in a different operator's) network, or other wireless communication systems, thereby supporting user mobility across MSC regions, roaming between systems, and local and long-distance landline telephone services.

BSC 206 is also connected to AN-AAA server 212, which supports initial link-level authentication and authorization for 1×-RTT and EVDO data sessions, as mentioned above. Data transport is provided by way of a communicative link 207 between the BSC 206 and a PDSN 214, which in turn provides connectivity with the service provider's core packet-data network 216. Sitting as nodes on network 216 are, by way of example, an authentication, authorization, and accounting (AAA) server 218, a mobile-IP home agent (HA) 220, and a border router BR 222 that provides secure connectivity to internet 224, such as the public Internet. The AAA server 218 provides network- and service-layer authentication and authorization support, and could be combined with AN-AAA server 212. BR 222 could include a firewall or other security mechanisms. Although not shown, core network 216 could comprise one or more additional switches, routers, and gateways that collectively provide transport and interconnection among the various entities and networks of network 200. In this context, for instance, core network 216 could be an overlay on or a sub-network of one or more additional networks.

Continuing with the description of FIG. 2, network 200 also includes a "Virtual Private Network" ("VPN") terminator 230 for terminating secure connections with authorized devices seeking access via unsecure, external networks such as internet 224. For instance, the femtocell 226 may connect to internet 224 over a broadband connection 227 (e.g., a cable modem connection or the like) to an Internet Service Provider (ISP) 228, and then to the VPN terminator 230. The femtocell could include a "VPN client" that establishes a secure "tunnel" with a "VPN server" in the VPN terminator such that packet-data communications over the secure tunnel between the femtocell and the VPN terminator can then take place securely. As is known in the art, secure VPN tunnels can be implemented according such protocols as "IPsec," although other mechanisms may be employed.

Assuming a secure VPN connection is established, the femtocell 226 may then communicate securely with other entities in network 200 by way of the VPN terminator 230. In particular, the femtocell 226 may receive configuration and messaging data and other operational parameters from femtocell controller 232, which provides similar control and services for other femtocells connected to network 200. A femtocell switch 234 acts as a switch between the MSC 208 and the VPN terminator 230, enabling access terminals communicating via femtocells, such as AT 202 via the femtocell 226, to engage in calls via MSC 208 to other wireless devices, as well as over the PSTN 210. Media translation between packet-based media data and circuit-based media data is carried out by a media gateway MG 236. Thus, the femtocell 226 may transmit packetized data to the MG 236 (via VPN terminator 230), which in turn translates (or transcodes) the data to circuit-based media for transmission on the PSTN 210, for example. The MG 236 performs the reverse translation for transmission in the opposite direction.

In the configuration depicted in FIG. 2, the communicative links 205, 207 and 209 represent, either individually or in combination, the backhaul between the BTS 205 and RAN elements further toward the core network. For instance, in a configuration in which the BTS and BSC are separate entities, the link 205 provides backhaul between the two components. As such, the link 205 could comprise one or more telecommunication trunks such as T1 or microwave links. In a configuration in which the BSC and BTS comprise a physically integrated base station, the link 207 would provide backhaul to the PDSN, while the link 209 would provide backhaul to the MSC. Either or both of these links could comprise one or more T1 lines or other high-speed optical links, for example.

In contrast to the arrangement with the macro-type base station, backhaul for the femtocell 226 is provided by the link 227 to the ISP 228. The link 227 could be a DSL or cable modem connection supporting typical residential broadband rates. Although not shown explicitly, the Internet 224 may include additional routers and switches, such as to support one or more packet-switched paths between the ISP 228 and the VPN terminator 230 in the wireless service provider network.

Also shown as an element connected in the Internet 224 is a Test Server 238. In accordance with embodiments described herein, the Test Server provides a means for determining the capacity of the link 227 by supporting measurement of achievable data rates on the link in data transfers between the femtocell 226 and the Test Server 238. This is further discussed below.

It should be understood that the depiction of just one of each network element in FIG. 2 is illustrative, and there could be more than one of any of them, as well as other types of elements not shown. The particular arrangement shown in FIG. 2 should not be viewed as limiting with respect to the present invention. Further, the network components that make up a wireless communication system such as system 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminal 202 typically comprises a user-interface, I/O components, a communication interface, a tone detector, a processing unit, and data storage, all of which may be coupled together by a system bus or other mechanism. As such, network 200, AT 202, and air interface 203-a,b, collectively are representative of example means of implementing and carrying out the various functions, steps, and procedures described herein.

As noted above, the term "base station" will be used herein to refer to a Radio Access Network (RAN) element such as a BTS, a BSC, or combination BTS/BSC, for instance. The term "radio network controller" (RNC) can also be used to refer to a BSC, or more generally to a base station. Accordingly, a femtocell may be considered to be form of micro-type base station or micro-type RNC. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. CDMA COMMUNICATIONS a. Conventional CDMA Communications

In a conventional CDMA wireless network compliant with the well known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When an access terminal operates in a given sector, communications between the access terminal and the BTS of the sector are carried on a given frequency and are encoded by the sector's PN offset and a given Walsh code. The power allocated to each channel is determined so as to optimize the signal to noise characteristics of all the channels, and may vary with time according to the number of access terminals being serviced, and their relative positions with respect to the BTS, among other factors.

Air interface communications are divided into forward link communications, which are those passing from the base station to the access terminal, and reverse link communications, which are those passing from the access terminal to the base station. In an IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels (depending on service demand, for example), and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

In order to facilitate efficient and reliable handoff of access terminals between sectors, under IS-2000 an AT can communicate on a given carrier frequency with a number of "active" sectors concurrently, which collectively make up the AT's "active set." Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors the pilot signals from its active sectors as well as from other sectors, which may vary as the AT moves about within the wireless communication system, or as other factors cause the AT's RF conditions to change. More particularly, the AT monitors a signal-to-noise metric referred to as "signal to interference plus noise ratio" ("SINR"), which includes the degrading effects of interference as well as noise on RF conditions. The AT reports the received signal strengths to the serving base station, which then directs the AT to update its active set in accordance with the reported strengths and one or more threshold conditions. Note that an AT's active set can include a femtocell.

With the arrangement described above, an access terminal can engage in cellular voice and/or in packet-data (1×-RTT) communications via either (or both of) a macro-type base station or a femtocell. Referring again to FIG. 2, and taking an originating call or data session from AT 202 as an example, AT 202 first sends an origination request either over air interface 203-*a* to the BTS 204 or over air interface 203-*b* to femtocell 226. The BSC 204 sends the request to MSC 208 via BSC 206. Alternatively, femtocell 226 sends the request to MSC 208 via femtocell switch 234. The MSC then signals back to the BSC or the femtocell directing one or the other to assign an air interface traffic channel for use by the access terminal.

For a voice call, the MSC uses well-known circuit protocols to signal call setup and establish a circuit connection to a destination switch that can then connect the call to a called device (e.g., landline phone or another access terminal). The MG 236 provides media translation if access is via the femtocell.

For a packet-data session, the BSC or the femtocell signals to the PDSN 214, which negotiates with the access terminal to establish a data link layer connection, such as a point to point protocol (PPP) link. The PDSN 214 sends a foreign agent advertisement that includes a challenge value to the access terminal, and the access terminal responds with a mobile-IP registration request (MIP RRQ), including a response to the challenge, which the PDSN forwards to HA 220. The HA then assigns an IP address for the access terminal to use, and the PDSN passes that IP address via either the BSC or the femtocell to the access terminal.

b. High Rate Packet-Data Communications

Under IS-2000, the highest rate of packet-data communications theoretically available on a fundamental traffic channel of the forward link is 9.6 kbps, dependent in part on the power allocated to the forward-link traffic channel and the resultant signal to noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set as described above, but receives forward-link transmission from only one active sector at a time. In turn, each sector transmits to all its active ATs on a common forward link using time division multiplexing (TDM), in order to transmit to only one access terminal at a time, but at the full power of the sector. As a result of the full-power allocation by the sector, an access terminal operating under IS-856 can, in theory, receive packet-data at a rate of at least 38.4 kbps and up to 2.4 Mbps. The reverse link under IS-856 retains largely the traditional IS-2000 code division multiplexing (CDM) format, albeit with the addition of a "data rate control" (DRC) channel used by the AT to indicate the supportable data rate and best serving sector for the forward link. More specifically, the DRC channel is a sub-channel of a reverse-link Medium Access Control (MAC) channel.

TDM access on the IS-856 forward link is achieved by dividing the forward link in the time domain into time slots of length 2048 chips each. At a chip rate of 1.228 Mega-chips per second, each slot has a duration of 1.67 milliseconds (ms). Each time slot is further divided into two 1024-chip half-slots, each half-slot arranged to carry a 96-chip pilot "burst" (pilot channel) at its center and a forward-link MAC channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data. As in IS-2000, each sector in IS-856 is defined by a PN offset, and the pilot channel carries an indication of the sector's PN offset. Again, a sector could correspond to a femtocell.

Operation in an IS-856 compliant communication system may be illustrated, again with reference to FIG. 2. To acquire an EVDO packet data connection, AT 202 sends a UATI (Universal Access Terminal Identifier) request to BSC 206 (via BTS 204) over air interface 203-*a* or to femtocell 226 over air interface 203-*b*. In response, the AT receives a UATI, which the access terminal can then use to identify itself in subsequent communications with the BSC or femtocell. The access terminal then sends a connection-request to the BSC 206 or to femtocell 226. Subsequent procedure depends on whether access is made via a macro-type base station (e.g., BSC 206) or a micro-type base station (e.g., femtocell 226).

For access via a macro-type base station, the BSC 206 responds to the connection-request by invoking a process to authenticate the access terminal and to have the access terminal acquire a data link. In particular, the BSC sends an access request to AN-AAA server 212 (which may be different than the AAA server 218), which then authenticates the access terminal. The BSC 206 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC signals to the PDSN 212, and the PDSN and access terminal then negotiate to establish a PPP data link. The access terminal then sends an MIP RRQ to the PDSN, which the PDSN forwards to the HA 220, and the HA assigns a mobile-IP address for the access terminal to use.

A femtocell does not typically maintain a connection to the AN-AAA server, and therefore does not request authentication and authorization of an AT by the AN-AAA server. Instead, the femtocell negotiates directly with the PDSN to establish the PPP link. Again, the access terminal then sends an MIP RRQ to the PDSN, which the PDSN forwards to the HA 220, and the HA assigns a mobile-IP address for the access terminal to use.

Once the access terminal has acquired an IS-856 radio link, a data link, and an IP address, the access terminal is considered to be in an active mode. In active mode, the AT receives its data distributed across MAC-identified time slots transmitted by the BTS of femtocell using the full power of the forward link of the sector selected by the AT (as described above). Thus, the access terminal recognizes its time-slot data from among other time slots by a MAC identifier included in each transmission, and processes only those time slots with the AT's assigned MAC identifier. Using the full power of the forward link maximizes the signal to noise ratio, thus facilitating higher rate data communication than the power-limited CDMA channels. Upon termination of the AT's EVDO session, the AT returns to an idle or dormant mode of operation.

2. ADJUSTMENT OF FORWARD-LINK POWER BASED ON BACKHAUL CAPACITY a. Operating Principles

Under IS-856, an AT engaging in an EVDO data session periodically transmits a DRC request message to its serving base station, wherein the requested rate is based on RF conditions of the forward link measured by the AT, as described above and in more detail below. More specifically, in maintaining its active set, the AT continually monitors the pilot signal from each sector in its active set to determine which has the best RF conditions on its forward link. The quality of the RF conditions on a forward link is measured in terms of SINR (or a similar metric), and the selected sector is designated the AT's "serving sector."

Typically, the power level of the pilot is specified as a gain level, x, according to the relation x dBm=10 $\log_{10}$(P/1 mW), where P is the power in mW (milliwatts). However, other power units could be specified. Measured in dBm, gain expresses a logarithmic ratio of power P to a fixed power level of 1 mW. More generally, the relative gain, y, of one power level $P_1$ to another $P_2$ is expressed as dB, and corresponds to a logarithmic ratio of $P_1$ to $P_2$ given by y dB=10 $\log_{10}(P_1/P_2)$. For instance, if y=3, then $P_1 \approx 2 \times P_2$; if y=−3, then $P_1 \approx 0.5 \times P_2$. In practice, SINR is measured in dB, where $P_1$ corresponds to the received power of the pilot and $P_2$ corresponds to the received noise plus interference power.

The AT determines the supportable data rate on the forward link by using the measured SINR of its serving sector to select one of several pre-determined data rates in a look-up table stored in the AT's memory, for instance. The AT then transmits a request for the selected data rate in a DRC message on the AT's reverse-link DRC sub-channel to its serving sector. An example of the DRC rate table is presented in Table 1.

TABLE 1

Associating SINR with data rate and DRC code

| SINR (dB) | Data Rate (kbps) | DRC code |
|---|---|---|
| Null | Null | 0 |
| −11.4 | 38.4 | 1 |
| −9.2 | 76.8 | 2 |
| −6.5 | 153.6 | 3 |
| −3.9 | 307.2 | 4 |
| −3.8 | 307.2 | 5 |
| −0.4 | 614.4 | 6 |
| −0.6 | 614.4 | 7 |
| 2.2 | 921.6 | 8 |
| 4.5 | 1,228.8 | 9 |
| 4.3 | 1,228.8 | 10 |
| 8.7 | 1,843.2 | 11 |
| 11.1 | 2,457.6 | 12 |
| 6.3 | 1,536 | 13 |
| 13.0 | 3,072 | 14 |

Each value of SINR in the table represents a lower bound (in dB) above which the associated data rate can be supported (and thus requested in a DRC message), and each consecutive pair of SINR values corresponds to a range within which the data rate associated with the lower end of the range may be requested. For instance, a value of SINR between −0.6 dB and +2.2 dB corresponds to a data rate of 614.4 kbps. As another example, a value of SINR between 8.7 dB and 11.1 dB corresponds to a data rate of 1,843.2 kbps, while SINR above +13.0 dB corresponds to a data rate of 3,072 kbps. Data rate values that appear twice are those for which the DRC codes specify different encoding schemes for the same rate. It will be appreciated that the values in Table 1 are examples, and others could be used.

After selecting an appropriate data rate based on SINR, the AT transmits the corresponding DRC code in a DRC request message, encoded into a four-bit "DRC symbol." The AT also includes the PN offset of the serving sector in the DRC request. In conventional operation, the serving sector (or base station) responds to the DRC request message by transmitting data on the forward link to the AT at the requested rate, without determining if the backhaul capacity can support the requested rate. In doing so, the serving base station uses a look-up table (or other recorded data structure) having the same mapping of DRC codes to forward-link data rates as Table 1 to interpret the received DRC request.

If the backhaul capacity in the direction of the base station is insufficient to support the requested data rate, then in conventional operation, the base station will essentially transmit data on forward link at faster than the data can arrive from the network. This may lead to delays as the base station waits for enough data to arrive from the network to warrant scheduling and transmission of forward-link packets. A mismatch of this type between the forward-link data rate (as requested by the AT) and the backhaul capacity in the forward direction can cause other inefficiencies as well. For instance, since the DRC request is based on SINR as measured by the AT, a DRC request that exceeds the backhaul capacity can represent wasted forward-link power.

Conversely, if the requested forward-link data rate is below that of the backhaul capacity, and if the base station's forward-link power budget has not been exceeded, so that a higher forward-link data rate could be accommodated by increasing power, then conventional operation may prevent the base station from offering better service (in the form of higher forward-link data rates). In either case, the failure of conventional rate control and power control procedures to account for backhaul capacity hampers the base station's ability to optimize performance in view of system configuration.

One configuration in which the above situations could arise is in a deployment that uses a femtocell. The backhaul for a femtocell is typically provided by a residential broadband connection, or the like. It can be the case that the capacity such a connection is below the highest forward-link data rates supportable by the femtocell, for example those near or above 2-3 Mbps, as given in Table 1. Alternatively, the relatively small and/or irregularly-shaped physical area that a femtocell is usually intended to cover may result in smaller values of SINR than can actually be provided by a femtocell, even though the backhaul capacity could accommodate higher forward-link data rates. Further, the backhaul capacity might change from time to time, so that a relative mismatch between achievable forward-link data rates and backhaul capacity could also vary with time. Taking account of backhaul capacity would therefore be advantageous to system performance and service quality.

In accordance with the example embodiment, instead of transmitting data to the AT at the requested rate regardless of the backhaul capacity, the base station will first to determine a forward-link data rate that is commensurate with the backhaul capacity. The base station can determine capacity of the backhaul connection by exchanging data with a test server via the backhaul connection, for example. In particular, the base station can determine a data-transfer rate on the backhaul connection in the forward-link direction—i.e., from the test server to the base station. The base station can then map the determined rate into one of a plurality of predetermined forward-link data rates, such as those defined in Table 1. Subsequently, while engaging in an EVDO communication session access terminal, the base station can adjust its forward-link power until the DRC requests it receives from the access terminal carry data-rate requests that are commensurate with the determined backhaul data rate. In this way, the base station can ensure that data rates requested by the AT are ones that the base station can actually deliver. Further details of an embodiment in a femtocell are described below.

b. Operation in a Femtocell

An embodiment of the present invention will be described by way of example with reference to a femtocell. It will be appreciated, however, the present invention is not limited in scope to embodiments involving only femtocells or other forms of micro-type base stations, but could also be applied to macro-type base stations. Similarly to the discussion above, numerous aspects of the discussion that follows do not assume one type of base station or another, except as may be explicitly described.

A typical femtocell may be approximately the size of a desktop phone or WiFi access point, and is essentially a low-power, low-capacity version of a macro-type base station. Thus, a typical femtocell will use a normal power outlet, perhaps with a transformer providing a DC power supply. The femtocell may have a wired (e.g., Ethernet) or wireless (e.g., WiFi) connection with a subscriber's broadband connection via a residential router or other broadband interface. As described above, a femtocell may establish a secure VPN to a VPN terminator in the provider's core network, and thereby be able to securely communicate via the VPN terminator with other entities on that core network and beyond.

The femtocell also has a wireless-communication (e.g., CDMA) interface that is compatible with the subscriber's access terminal(s), such that the femtocell may act as a micro-type base station, providing coverage in the wireless-service provider's network via the subscriber's Internet connection. Usually, a femtocell will provide service on a single RF carrier per air interface (e.g., 1x-RTT and EVDO), and also transmit its own pilot signal.

In accordance with the example embodiment, a femtocell will determine its backhaul capacity when it is initially configured, and possibly from time to time thereafter. More specifically, when a femtocell is first installed in a residential network or the like, it will invoke a data transfer test with a remotely-located test server via the backhaul connection. For example, when the femtocell is connected to a residential broadband network, e.g., via to a cable modem or DSL modem connection to an ISP, and powered on, the femtocell will invoke the data transfer test as part of its start-up procedures. The femtocell may thereafter invoke the same or similar test from time to time, either periodically or upon detecting a change in the broadband connection, for example.

The test server could be part of the service provider's network, or could be a third-party server known by the service provider to be trust-worthy and/or secure. Test servers that provide tests allowing a network device, such as a computer, to measure upload and download speeds on the broadband connection are currently available and known in the art. The femtocell could thus access such a test server to determine its backhaul capacity. The measured download or "downlink" speed, which corresponds to the forward-link direction, could then be used by the femtocell determine a commensurate forward-link data rate from among the predetermined values defined according to EVDO standards. The femtocell could similarly update its determined commensurate data rate each time it thereafter re-measures its backhaul capacity.

The femtocell could determine which forward-link rate is commensurate with the measured downlink rate by consulting a mapping table stored, for example in its memory. For purposes of the present discussion, such a mapping table is referred to herein as a "backhaul-DRC table."

FIG. 3 shows an example backhaul-DRC table 300 for mapping between the determined backhaul data-rate and DRC values. The backhaul-DRC table 300 includes a first column 302 that specifies several downlink data rates or ranges of downlink data rates; a second column 304 that specifies forward-link data rates corresponding to downlink rates in the first column 302; and a third column 306 that specifies DRC codes corresponding to the associated entries of the first two columns. The second and third columns 304 and 306 of the backhaul-DRC table 300 correspond to the second and third columns of Table 1. It may be noted that the backhaul-DRC table 300 does not necessarily need to tabulate SINR, since SINR is a measurement made by the access terminal in order to determine which forward-link data rate to request.

In further accordance with the example embodiment, once the femtocell determines the downlink data rate supportable by its backhaul (the broadband connection to the ISP in the present illustration), it will look for the closest match in the backhaul-DRC table. For example, if the determined downlink rate were 214 kbps, then the femtocell would match that rate to the forward-link rate of 307.2, corresponding to DRC code 4. As another example, if the determined downlink rate were 4,500 kbps, then the femtocell would match that rate to the forward-link rate of >3,000 kbps, corresponding to DRC code 14. The femtocell would determine the forward-link data rate and corresponding DRC code in a similar manner for other determined downlink data rates. The forward-link data rate and corresponding DRC code determined by the femtocell based on backhaul capacity are referred to respectively herein as the "target" forward-link data rate and the "target" DRC code.

Once the femtocell determines the target forward-link data rate and the corresponding target DRC code, it will attempt to ensure that the AT does not request a forward-link data rate that exceeds the target rate by adjusting the transmission power level of its pilot signal. Since the AT determines what DRC rate to request based on SINR, and SINR depends in part on the AT's measured strength the femtocell's pilot signal, by adjusting the transmission power level of its pilot signal, the femtocell can cause SINR measured by the AT correspondingly adjust. For example, again referencing Table 1, if the AT measures a SINR of +8.9 dB, it will select a DRC code of 11, corresponding to a requested forward-link data rate of 1,843.2 kbps. However, if the target forward-link data rate is 921.6, which has a corresponding target DRC code of 8, the femtocell will reduce the transmission power level of its pilot signal until it begins receiving a DRC code of 8 from the AT. This will happen when the SINR measured by the AT drops just below +4.3 dB. At this point, the AT will be requesting a forward-link data rate equal to the target forward-link data rate, the hence commensurate with the downlink data rate supportable by the backhaul connection.

In speaking of a forward-link data rate that is commensurate with the backhaul capacity, it is convenient to describe limiting the forward-link rate so that it does not exceed the downlink rate on the backhaul connection. Referring again to FIG. 3 and considering the example above, it is seen that the target forward-link data rate of 921.6 kbps corresponds to a backhaul downlink rate in the range 768-1,024 kbps. While this target rate is commensurate with an average expected downlink rate, it is possible that an actual download via the backhaul might include one or more bursts near (or even above) the high end of the range. In such an instance, the downlink rate would momentarily exceed the capacity of the forward link to the AT, as specified by the target forward-link data rate. To the extent that such bursts are relatively infrequent, the forward-link should not present a bottleneck for downloads to the AT.

As an alternative approach, the target forward-link data rate can be set to value just above the measured downlink rate on the backhaul connection. For instance, the backhaul downlink rate of 214 kbps discussed by way of example above could be considered to fall in the range 128-256 kbps, corresponding to a target forward-link data rate of 153.6 kbps and a DRC code of 3. However, by instead selecting the target forward-link data rate of 307.2 kbps (corresponding to a target DRC code of 4), the forward-link data rate can be expected to always be slightly higher than the backhaul downlink rate. This would ensure that the forward-link could always accommodate downloads within the measured downlink rate range. Such an approach would be advantageous for accommodating downloads, such as video streaming, having higher sustained (as opposed to bursty) rates.

In addition to improved performance of data transport afforded by making the forward-link data rate commensurate with the backhaul capacity, doing so by adjusting the femtocell's transmission power level is also advantageous regarding power management. This may be seen by considering the pilot signal power level adjustment in terms of the expressions above for relative gain. Taking the example above of reducing SINR measured by the AT from +8.9 dB to +4.3 dB, and making the reasonable assumption that the noise plus interference contribution to SINR is the same before and after the adjustment, it follows that the reduction in SINR results only from the change in pilot signal power and is thus given by $\Delta SINR = 10 \log_{10}(P_{DRC11}/P_{DRC8})$. Here, $P_{DRC11}$ is the pilot power when the AT selects a DRC code of 11 (i.e., when SINR=+8.9 dB), and $P_{DRC8}$ is the pilot power when the AT selects a DRC code of 8 (i.e., when SINR=+4.3 dB). Since $\Delta SINR=4.6$, it follows that $P_{DRC8}=0.35 \times P_{DRC11}$, or almost a factor of three reduction in pilot signal power. Thus, matching the forward-link data rate the backhaul capacity can also save power. The actual power savings will depend on $\Delta SINR$.

It can also be the case that the femtocell is receiving DRC requests from an AT for forward-link rates below the target forward-link rate. This could occur because that AT is situated a particular location at which the femtocell's coverage is poor, for example. If the femtocell's coverage is generally good, such a circumstance could be temporary or transient, and might improve when the AT moves away from the particular location. However, it may be that the femtocell is providing suboptimal coverage throughout the space in which it is deployed. Receiving DRC requests that are relatively consistently below the target forward-link data rate could be an indication of such suboptimal coverage. It may further be the case that the power budget of the femtocell is such that it could increase its forward-link power. For example, it may be transmitting a pilot signal at a power level below a maximum threshold level.

In further accordance with the example embodiment, if the femtocell receives DRC requests that are below the target forward-link data rate, and if the femtocell can increase its transmission power level, then the femtocell will increase the strength of its pilot signal until it either starts receiving DRC requests at the target forward-link rate, or it reaches a maximum allowed power level for its pilot, whichever occurs first. In so doing, the femtocell will advantageously provide the best forward-link service to the AT, commensurate with both the supportable downlink rate on its backhaul connection and its available power budget.

While the above description has implicitly considered just one access terminal, a typical femtocell deployment might actually provide coverage for more than one access terminal. In practice, the number of ATs served by a single femtocell will be much smaller than that served by a macro-type base station. This offers the possibility of applying the above approach to one to a few ATs served by a femtocell. For example, the femtocell might be able to change its forward-link power level from time to time, depending on which of a few ATs it is communication with at any given moment. Or it could adjust its forward-link power to provide the best possible coverage to one or another of the ATs. Other adjustment schemes are possible as well.

3. IMPLEMENTATION OF EXAMPLE EMBODIMENT

As described above, the example embodiment involves actions and operations carried out by a femtocell (or other type of base station). Accordingly, the example embodiment can be implemented as executable steps and operations method carried out by a femtocell. Implementation of the example embodiment can further be considered as including means for carrying the method. An example implementation of the method and means is described below. By way of example, the femtocell is taken to be configured to operate according to a CDMA family of protocols, including IS-2000 and IS-856, in a similarly-compliant wireless communication system, such as the one described above in connection with FIG. 2.

a. Example Method Implementation in a Base Station

Figure 4:
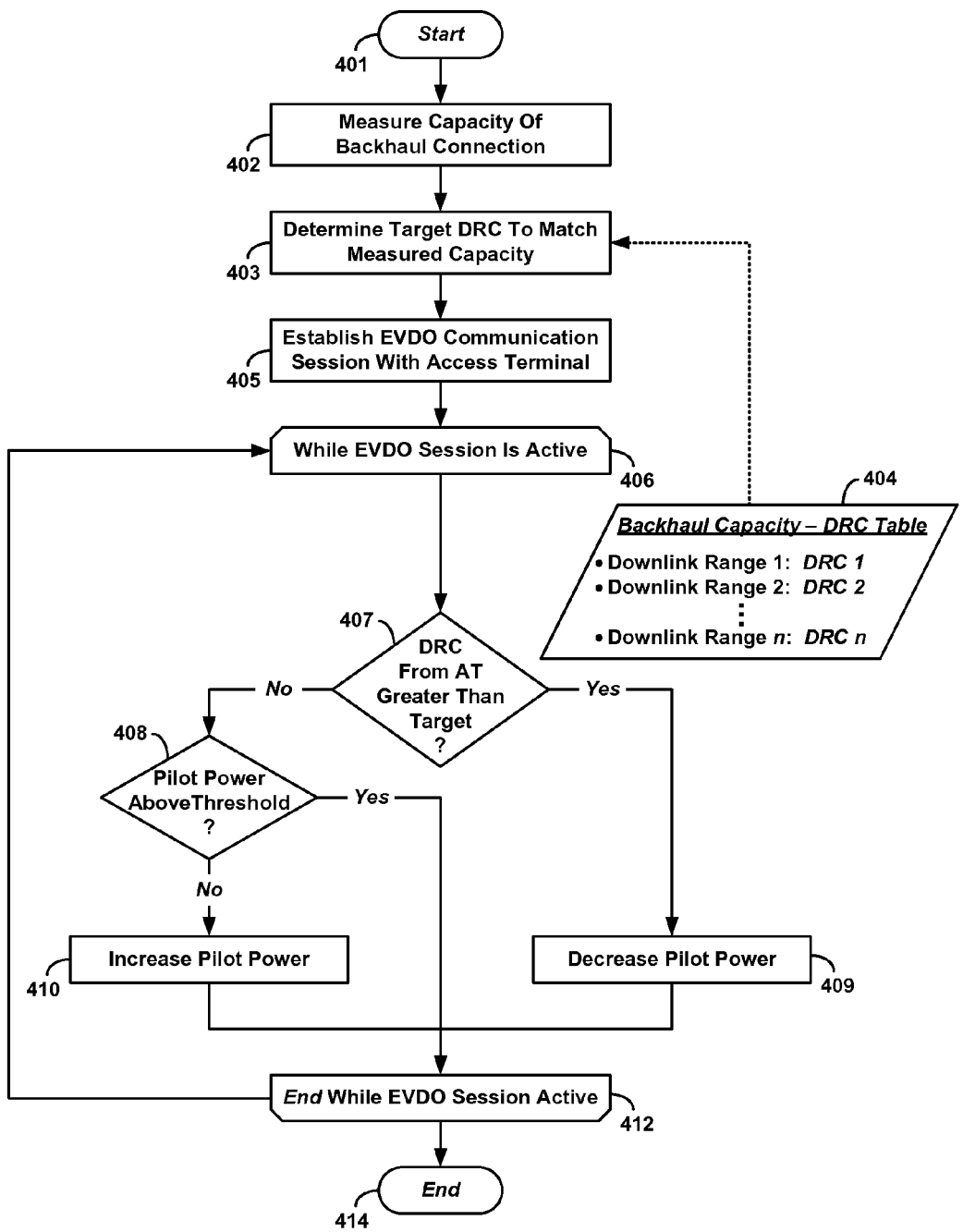
FIG. 4 illustrates an example embodiment of logical steps for implementing in a micro-type base station a method of adjusting wireless access coverage based on backhaul capacity.

FIG. 4 is a logical flowchart representing executable steps and operations that could be carried out by micro-type base station to implement a method of adjusting wireless access coverage based on backhaul capacity. The illustrated steps could be implemented in a femtocell as executable instructions stored in the memory of the femtocell and executed by one or more processors of the femtocell.

The process as illustrated begins at start 401, wherein the femtocell may be deployed as a serving base station (or access node) for one or more access terminals. As described, the femtocell would be configured with a broadband connection (or the like) to a connection point to the Internet (e.g., and ISP). As such, the broadband connection would comprise a backhaul connection for the femtocell.

At step 402, the femtocell measures the capacity of its backhaul connection. For example, as part of power-on and start-up, the femtocell could initiate a bandwidth test with a test server via it backhaul connection, as described above. In accordance with the example embodiment, the backhaul capacity would be determined in terms of a supportable downlink rate; i.e., from the ISP to the femtocell. Note that the while the backhaul connection has been described as just the broadband connection to the ISP, it could also include additional data paths between the ISP and the wireless communication system as well. To the extent that such additional paths are also traversed by the connection to the test server, then the capacity measurement would still provide a valid and useful measurement as part of the example methods described herein.

At step 403, the femtocell uses the measured backhaul capacity to determine a target forward-link data rate and corresponding target DRC code. In doing so the femtocell consults a Backhaul Capacity—DRC Table 404, represented as a parallelogram in the figure. The dashed arrow from the Table 404 to block 403 indicates the table access as part of the execution of step 403. The Table 404 could be stored in the femtocell's memory (e.g., solid state or magnetic disk). The femtocell could similarly store the target DRC rate and code in its memory for application in the subsequent execution of the example method.

By way of example, it is assumed that at some later time (after step 403), the femtocell establishes an EVDO communication session with an access terminal. This is shown at step 405. Then at step 406, the femtocell's actions with respect to the example method are represented as being carried out within a "while loop" 406 that persists as long as the EVDO session remains active.

At step 407, the femtocell receives a DRC request from the AT and determines if the requested forward-link data rate is greater than the target rated determined at step 403. If the DRC request does exceed the target DRC rate ("Yes" branch from step 407), then the femtocell decreases the transmission power level of its pilot signal. For example, the femtocell could reduce its current pilot level by 1 dB. It will be appreciated that the amount of the decrease could be larger or smaller than this amount. Further, the amount of the decrease could depend on the size of the difference between the DRC request and the target DRC rate, whereby a larger difference would cause the femtocell to reduce its power by a larger incremental amount, and vice versa.

Execution then proceeds to step 412, which defines the completion of the while loop 406. As such, the femtocell returns to the "top" of the loop 406 if the EVDO session is still active, or the process ends at step 414. If the process returns to the top of the loop 406, execution of the steps with in the loop repeats.

If at step 407, the DRC request does not exceed the target DRC rate ("No" branch from step 407), then the femtocell determines at step 408 if its current pilot transmission level is above a threshold level. If it is not above the threshold level ("No" branch from step 408), then the femtocell increases the transmission power level of its pilot signal at step 410. The increase could be an increment of 1 dB, although again, other amounts could be used. The size of the increase could depend on the size of the difference between the DRC request and the target DRC rate, as well as on how far the current pilot power level is below the threshold level. Execution then proceeds to step 412, and from there, either back to the top of the loop 406, or to the end 414 of the process, as described above.

If at step 408 the femtocell determines its current pilot transmission level is above the threshold level ("Yes" branch from step 408), then execution proceeds directly to step 412. In this case no action is taken with regard to adjust pilot power, at least not during this pass through the loop. Again, the process either repeats from the top of the loop 406 or ends at step 414.

It will be appreciated that the steps shown in FIG. 4 are meant to illustrate operation of the example embodiment. As such, various steps could be altered or modified, the ordering of certain steps could be changed, and additional steps could be added, while still achieving the overall desired operation.

b. Example Base Station

Figure 5:
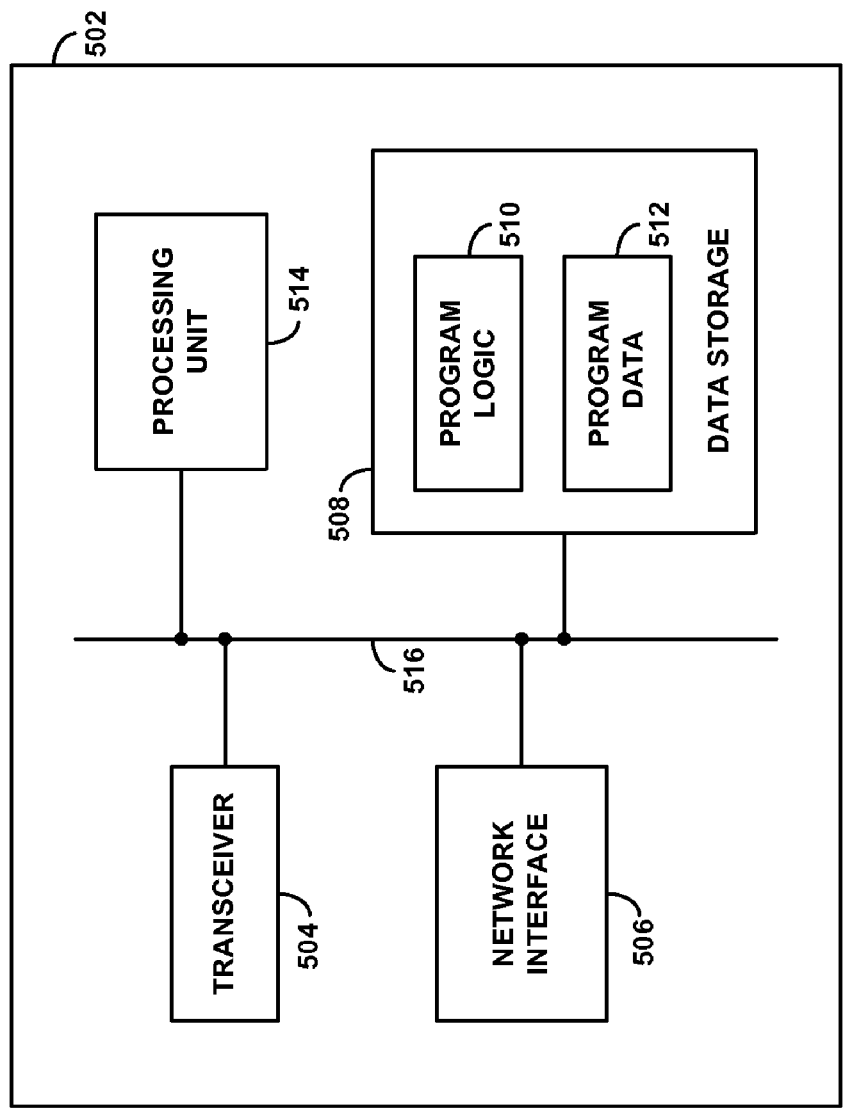
FIG. 5 is a block diagram of an example base station in which adjusting wireless access coverage based on backhaul capacity may be implemented.

FIG. 5 is a simplified block diagram depicting functional components of an example femtocell 502 in which operation of adjusting wireless access coverage based on backhaul capacity may be implemented. As shown in FIG. 5, the example femtocell 502, representative of femtocell 226 in FIG. 2, for instance, includes a transceiver 504, network interface 506, a processing unit 514, and data storage 508, all of which may be coupled together by a system bus 516 or other mechanism. In addition, the base station may also include external storage, such as magnetic or optical disk storage, although this is not shown in FIG. 5.

These components may be arranged to support conventional operation in a wireless communication network that is compliant with a CDMA family of protocols, such as network 200 illustrated in FIG. 2. The details of such an arrangement and how these components function to provide conventional operation are well-known in the art, and are not described further herein. Certain aspects of base station 502 relevant to adjusting wireless access coverage based on backhaul capacity are discussed briefly below.

Network interface 506 enables communication on a network, such network 200, either directly or via an external connection such as VPN over a broadband connection. As such, network interface 506 may take the form of an Ethernet network interface card or other physical interface to a broadband connection to the internet or some other data network, and further can support a VPN connection terminated in a communication network such as network 200, for instance. Further, network interface 506 in combination with transceiver 504, which may include one or more femtocell-scale BTS antennas, enables air interface communication with one or more access terminals, supporting both forward-link and reverse-link CDMA-based transmissions.

Processing unit 514 comprises one or more general-purpose processors (e.g., INTEL microprocessors) and/or one or more special-purpose processors (e.g., dedicated digital signal processor, application specific integrated circuit, etc.). In turn, the data storage 508 comprises one or more volatile and/or non-volatile storage components, such as magnetic or optical memory or disk storage. Data storage 508 can be integrated in whole or in part with processing unit 514, as cache memory or registers for instance. As further shown, data storage 508 is equipped to hold program logic 510 and program data 512.

Program data 512 may comprise data such as example backhaul-DRC table 300, or the like. Program logic 510 may comprise machine language instructions that define routines executable by processing unit 514 to carry out various functions described herein. In particular the program logic, communication interface, and transceiver may operate cooperatively to carry out logical operation such as that discussed above and illustrated in FIG. 4.

It will be appreciated that there can be numerous specific implementations of a femtocell, such as femtocell 502, in which a method of adjusting wireless access coverage based on backhaul capacity could be implemented. Further, one of skill in the art would understand how to devise and build such an implementation. As such, femtocell 502 is representative of means for carrying out a system-side method of adjusting wireless access coverage based on backhaul capacity, in accordance with the methods and steps described herein by way of example.

4. CONCLUSION

An exemplary embodiment of the present invention has been described above. Those skilled in the art will understand, however, that changes and modifications may be made to this embodiment without departing from the true scope and spirit of the invention, which is defined by the claims.

We claim:

1. In a base station communicatively coupled with a wireless communication system by way of a backhaul connection, a method comprising:
    determining a capacity of the backhaul connection for transport of data communications; and
    adjusting a transmission power level on a first forward link of an air interface to a first access terminal based on the determined capacity,
    wherein the base station and the first access terminal are configured to operate according to a CDMA family of protocols, including at least 1 times radio transmission technology (1×-RTT) and evolution data optimized (EVDO), and wherein adjusting the transmission power level on the first forward link of an air interface to the first access terminal based on the determined capacity comprises:

determining a supportable data rate to the base station over the backhaul connection based on the determined capacity; and setting the transmission power on the first forward link to a tuned level that supports a forward-link data rate to the first access terminal commensurate with the supportable data rate by adjusting the transmission power level on the first forward link of the air interface until forward-link data rate control (DRC) messages received from the first access terminal correspond to a requested data rate that is within a predefined range about the supportable data rate.

2. The method of claim 1, wherein the base station is a femtocell configured to operate in the wireless communication system.

3. The method of claim 2, wherein the wireless communication system is configured to operate according to a CDMA family of protocols, including at least 1×-RTT and EVDO.

4. The method of claim 1, wherein the backhaul connection comprises packet-switched data transport.

5. The method of claim 1, wherein determining the capacity comprises:
performing a data-rate test with a test server via the backhaul connection; and
determining a supportable data rate to the base station over the backhaul connection based on the data-rate test.

6. The method of claim 1, wherein adjusting the transmission power level on the first forward link of the air interface comprises adjusting a power level of a pilot beacon transmitted by the base station.

7. The method of claim 1, further comprising adjusting a transmission power level on a second forward link of the air interface to a second access terminal based on the determined capacity.

8. A base station configured to be communicatively coupled with a wireless communication system by way of a backhaul connection, the base station comprising:
one or more processors;
memory accessible by the one or more processors; and
machine-language instructions stored in the memory that, upon execution by the one or more processors, cause the base station to carry out functions including:
determining a capacity of the backhaul connection for transport of data communications, and
adjusting a transmission power level on a first forward link of an air interface to a first access terminal based on the determined capacity,
wherein the base station is further configured to communicate with the first access terminal according to a CDMA family of protocols, including at least 1 times radio transmission technology (1×-RTT) and evolution data optimized (EVDO),
and wherein adjusting the transmission power level on the first forward link of an air interface to the first access terminal based on the determined capacity comprises:
determining a supportable data rate to the base station over the backhaul connection based on the determined capacity; and
setting the transmission power on the first forward link to a tuned level that supports a forward-link data rate to the first access terminal commensurate with the supportable data rate by adjusting the transmission power level on the first forward link of the air interface until forward-link data rate control (DRC) messages received from the first access terminal correspond to a requested data rate that is within a predefined range about the supportable data rate.

9. The base station of claim 8, the base station is a femtocell.

10. The base station of claim 8, wherein the backhaul connection comprises packet-switched data transport.

11. The base station of claim 8, wherein the base station is further configured to be communicatively coupled with a test server via the backhaul connection,
and wherein determining the capacity comprises:
performing a data-rate test with the test server via the backhaul connection; and
determining a supportable data rate to the base station over the backhaul connection based on the data-rate test.

12. The base station of claim 8, wherein adjusting the transmission power level on the first forward link of the air interface comprises adjusting a power level of a pilot beacon transmitted by the base station.

13. The base station of claim 8, the functions further include adjusting a transmission power level on a second forward link of the air interface to a second access terminal based on the determined capacity.

14. A tangible non-transitory computer-readable medium having instructions stored thereon that, upon execution by one or more processors of a base station, cause the base station to carry out functions comprising:
determining a capacity of a backhaul connection by which the base station is configured to be communicatively connected with a wireless communication system; and
adjusting a transmission power level on a first forward link of an air interface to a first access terminal based on the determined capacity,
wherein the base station is further configured to communicate with the first access terminal according to a CDMA family of protocols, including at least 1 times radio transmission technology (1×-RTT) and evolution data optimized (EVDO),
and wherein adjusting the transmission power level on the first forward link of an air interface to the first access terminal based on the determined capacity comprises:
determining a supportable data rate to the base station over the backhaul connection based on the determined capacity; and
setting the transmission power on the first forward link to a tuned level that supports a forward-link data rate to the first access terminal commensurate with the supportable data rate by adjusting the transmission power level on the first forward link of the air interface until forward-link data rate control (DRC) messages received from the first access terminal correspond to a requested data rate that is within a predefined range about the supportable data rate.

15. The tangible non-transitory computer-readable medium of claim 14, wherein the base station is a femtocell.

16. The tangible non-transitory computer-readable medium of claim 14, wherein the backhaul connection comprises packet-switched data transport.

17. The tangible non-transitory computer-readable medium of claim 14, wherein the base station is further configured to be communicatively coupled with a test server via the backhaul connection, and wherein determining the capacity comprises:
performing a data-rate test with the test server via the backhaul connection; and
determining a supportable data rate to the base station over the backhaul connection based on the data-rate test.

18. The tangible non-transitory computer-readable medium of claim 14, wherein adjusting the transmission power level on the first forward link of the air interface comprises adjusting a power level of a pilot beacon transmitted by the base station.

19. The tangible non-transitory computer-readable medium of claim 14, wherein the functions further comprise adjusting a transmission power level on a second forward link of the air interface to a second access terminal based on the determined capacity.

* * * * *